United States Patent [19]
Kloots et al.

[11] 3,776,614
[45] Dec. 4, 1973

[54] MICROSCOPE WITH REMOTE IMAGE SYSTEM

[75] Inventors: Jacobus Kloots, Sturbridge; Rato Buhler, Brimfield, both of Mass.

[73] Assignee: Applied Fiberoptics and Scientific Specialties, Inc., Southbridge, Mass.

[22] Filed: Mar. 1, 1972

[21] Appl. No.: 231,191

[52] U.S. Cl.................. 350/35, 350/36, 350/19, 350/91, 350/96 B
[51] Int. Cl............................................. G02b
[58] Field of Search............... 350/35, 19, 91, 96 B, 350/36

[56] References Cited
UNITED STATES PATENTS

| | | | |
|---|---|---|---|
| 3,068,772 | 12/1962 | Mac Neille | 350/96 B X |
| 3,666,346 | 5/1972 | Lucas | 350/96 B X |
| 3,173,984 | 3/1965 | Vogl | 350/35 X |
| 3,637,283 | 1/1972 | Tasaki et al. | 350/96 B X |
| 3,166,623 | 1/1965 | Waidelich | 350/96 B |
| 3,186,300 | 6/1965 | Littmann | 350/91 |
| 3,656,829 | 4/1972 | Wilms | 350/19 X |

Primary Examiner—David H. Rubin
Attorney—Thomas N. Tarrant

[57] ABSTRACT

A long-viewing-distance microscope is disclosed having a single objective lens utilized by a plurality of optical systems facing the objective lens in parallel so as to be focused to the same viewing spot, one of the optical systems including a coherent fiber-optics cable for providing a remote image.

3 Claims, 4 Drawing Figures

MICROSCOPE WITH REMOTE IMAGE SYSTEM

BACKGROUND OF THE INVENTION

1. Field of the Invention

The present invention relates to long-working-distance microscopes and in particular to such microscopes that have an additional optical output for camera attachment or remote viewing.

2. Description of the Prior Art

The long-working-distance microscope has become an important tool for use in fine detail work and examination. While of particular value in the medical field, it is also found on many of todays fine detail precision production lines. In many of its uses and particularly in the medical field it is highly desirable to make the view of the microscope available to an assisting or consulting person, or for TV or photographic camera pickup. These microscopes are desirably stereo and have built-in light sources. Camera pickups for use simultaneously with viewing commonly utilize beam-splitting mirrors and are sidearm mounted. Light sources are frequently mounted right on the optical frame. The resulting structures are usually cumbersome and unwieldy.

SUMMARY OF THE INVENTION

In accordance with the present invention a compact, long-working-distance microscope is provided which uses a fiber-optics image guide operating through the same main objective lens used by the direct viewing optics. This fiber-optics image guide provides a remote image for auxiliary viewing and camera pickup. Illuminating by a fiber-optics light guide through the same lens enables an extremely compact microscope in which light sources and remote-viewing accessories are connected only by small flexible cables.

Thus it is an object of the invention to provide a long-working-distance microscope with a fiber-optics remote viewing image guide utilizing the same main objective lens used by the direct viewing optics.

It is a further object of the invention to provide a stereo long-working-distance microscope in which the stereo optics and a fiber-optics imaging output utilize the same main objective lens.

It is still a further object of the invention to provide optical viewing apparatus in which a light input for illuminating the viewed object, an image pickup for remote utilization and direct viewing means all use separate optics up to the final objective lens, and each faces the same final objective lens in parallel with the others.

It is a further object of the invention to provide a direct viewing optical system having an image pickup connected to a fiber-optics cable for remote image utilization in which the direct viewing optics and the image pickup optics face the same objective lens in parallel.

Further objects and features of the invention will become apparent upon reading the following description together with the Drawing.

DESCRIPTION OF A PREFERRED EMBODIMENT

Figure 1:
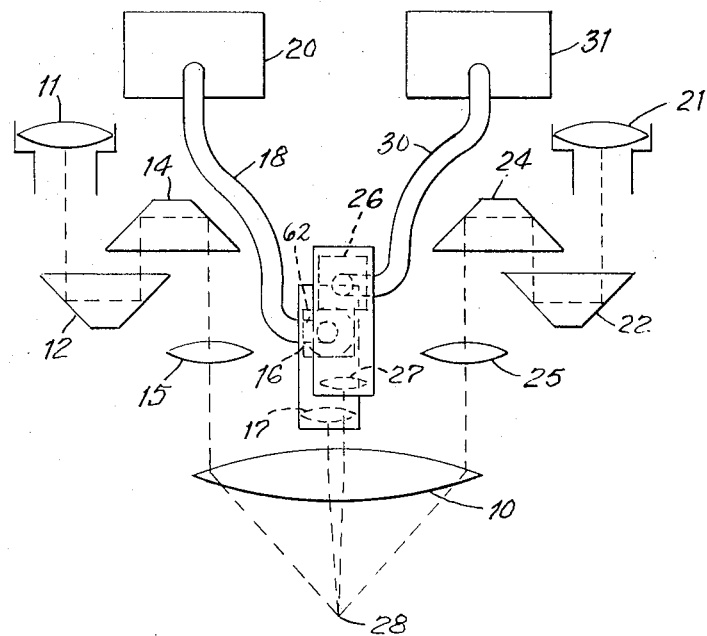
FIG. 1 is a diagramatic illustration of optical apparatus according to the invention.

A preferred embodiment of the invention is a stereo microscope provided with illuminating and remote image accessories without the bulk usually associated with such apparatus. The bulk of the microscope itself is made even smaller than usual by folded optical paths. FIG. 1 depicts the optical elements of this embodiment and their relationships.

Four optical systems are depicted in FIG. 1, each using objective lens 10. Steroscopic direct viewing optical systems commence with eyepieces 11 and 21. Following eyepiece 11 is prism 12 which reflects the optical path through two right angles into a second prism 14. Second prism 14 reflects the optical path through two more right angles to lens 15. Lens 15 is positioned facing lens 10 with its axis parallel with the axis of lens 10. Similarly eyepiece 21 is followed by two prisms 22 and 24 which fold the optical path twice using four right angle reflections. Lens 25 following prism 24 faces lens 10 at a spaced position from lens 15. A third optical system includes collector lenses 16 and condenser lens 17. Condenser lens 17 faces objective lens 10 in parallel with and spaced from lenses 15 and 25. A fiber-optics light guide 18 connects collector lenses 16 to light source 20. Finally a fourth optical system consists of a fiber-optics imaging system which may be called an imagescope. In the embodiment depicted, this imagescope at the pickup end consists of double reflecting prism 26 followed by lens 27. Lens 27 faces objective lens 10 in parallel with and spaced from lenses 15, 25 and 17. Lens 27 is designed to focus an image of viewed object 28 on the entrance face of coherent flexible fiber-optics cable 30. Double reflecting prism 26 is not essential in this path but serves to avoid interference with the viewing systems and to maintain the desired compactness. Two reflections are needed to keep a right-reading image. Cable 30 terminates with a utilization device depicted as camera 31. An optical adapter is used for any utilization and it may be a viewing adapter for remote viewing by a person or an adapter to TV camera or photographic camera optics. Optical adapters for the different utilizations are well known and need not be described. The diameter of objective lens 10 is determined by the preferred spacing of lens 15 and 25 to obtain the desired stereo perception. A center-to-center spacing of lenses 15 and 25 in the ranges of one to two inches has been found suitable. Lenses 17 and 27 may be advantageously positioned as close to the central axis of lens 10 as is convenient. In one model, lenses 15, 25 and 27 were all positioned 0.725 inches off the central axis of lens 10 while lens 17 was positioned 0.6 inches off the axis of lens 10. Lens 17 of the illuminating system was placed closer to the central axis in order to reduce shadows as much as possible.

Figure 2:
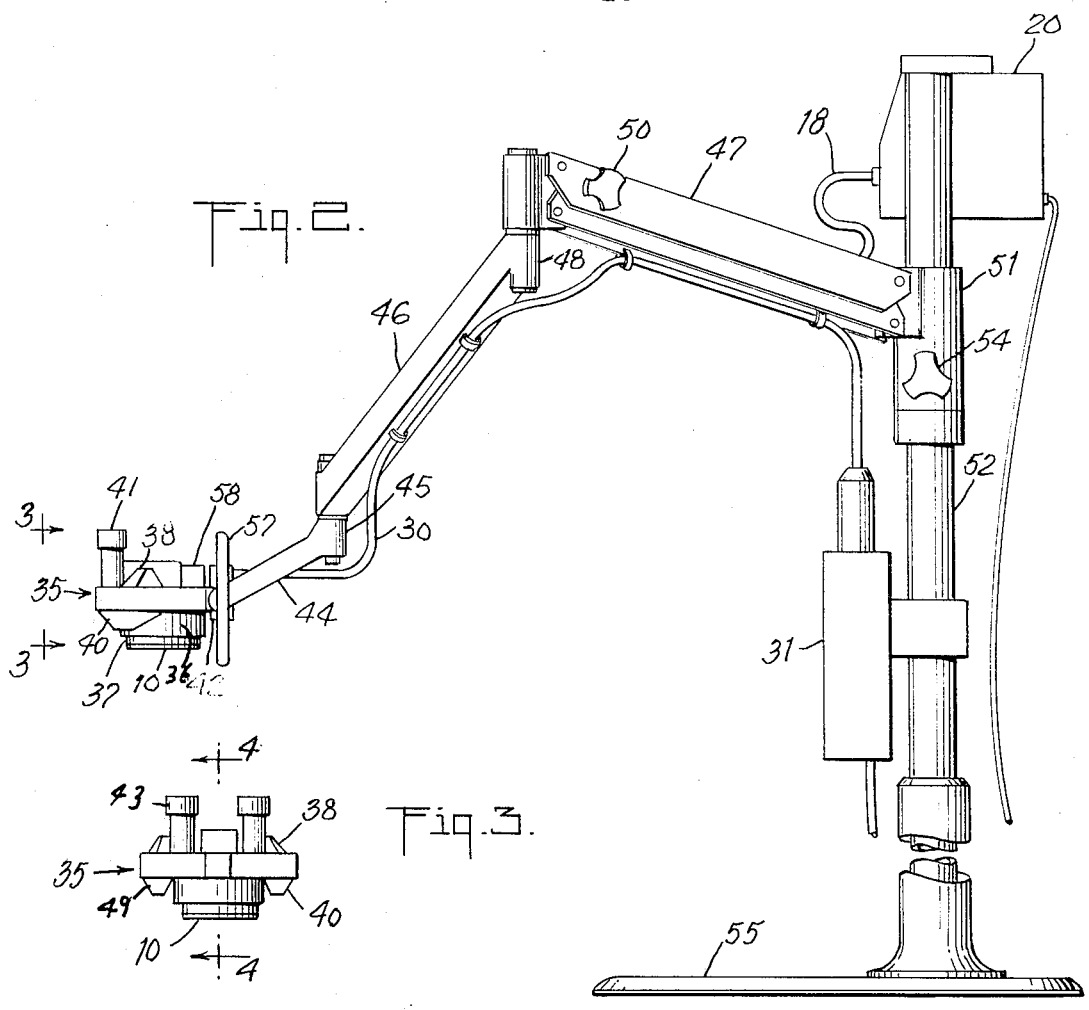
FIG. 2 is a perspective view of the optical apparatus according to the invention mounted on suspension arms.

FIG. 2 depicts the optical system of FIG. 1 as floor stand mounted apparatus. Microscope 35 has body 36 carrying objective lens mounting 37. Housings 38 and 40 carry prisms 24 and 22 of FIG. 1. Eyepiece 41 contains the ocular lenses 21. Fiber-optics guide 18 is connected coaxially through rotary joint 42. Joint 42 permits microscope 35 to revolve about an axis passing between the two direct viewing systems. Rotary joint 42 connects to an arm 44 having rotary joint connection 45 to second arm 46. Arm 46 connects to third arm 47 by second rotary connection 48. Third arm 47 is of a type sometimes called an equipoise arm having two mutually reciprocal members internally connected by counter balance springs. Hand-operated friction clutch 50 is provided to damp or lock the equipoise mechanism. Arm 47 in turn is secured to collar 51 on vertical pipe 52. The collar 51 may be moved up or down on pipe 52 and locked in position by clamping screw 54. Pipe 52 is mounted on a floor stand 55. Handle 57 serves to move microscope 35 to desired positions within the range of arms 44, 46 and 47 without handling microscope 35 itself. Fiber-optics guide 18 passes internally of arms 44, 46 and 47 as well as connecting joints 45 and 48 to connect light source 20. Imagescope connection 58 uses externally mounted coherent fiber-optics cable 30 for connection to TV camera 31 mounted on pipe 52 below collar 51.

Figure 3:
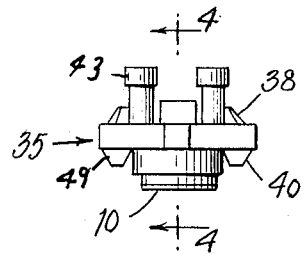
FIG. 3 is an elevation on line 3—3 of FIG. 2 showing optical apparatus only.
Figure 4:
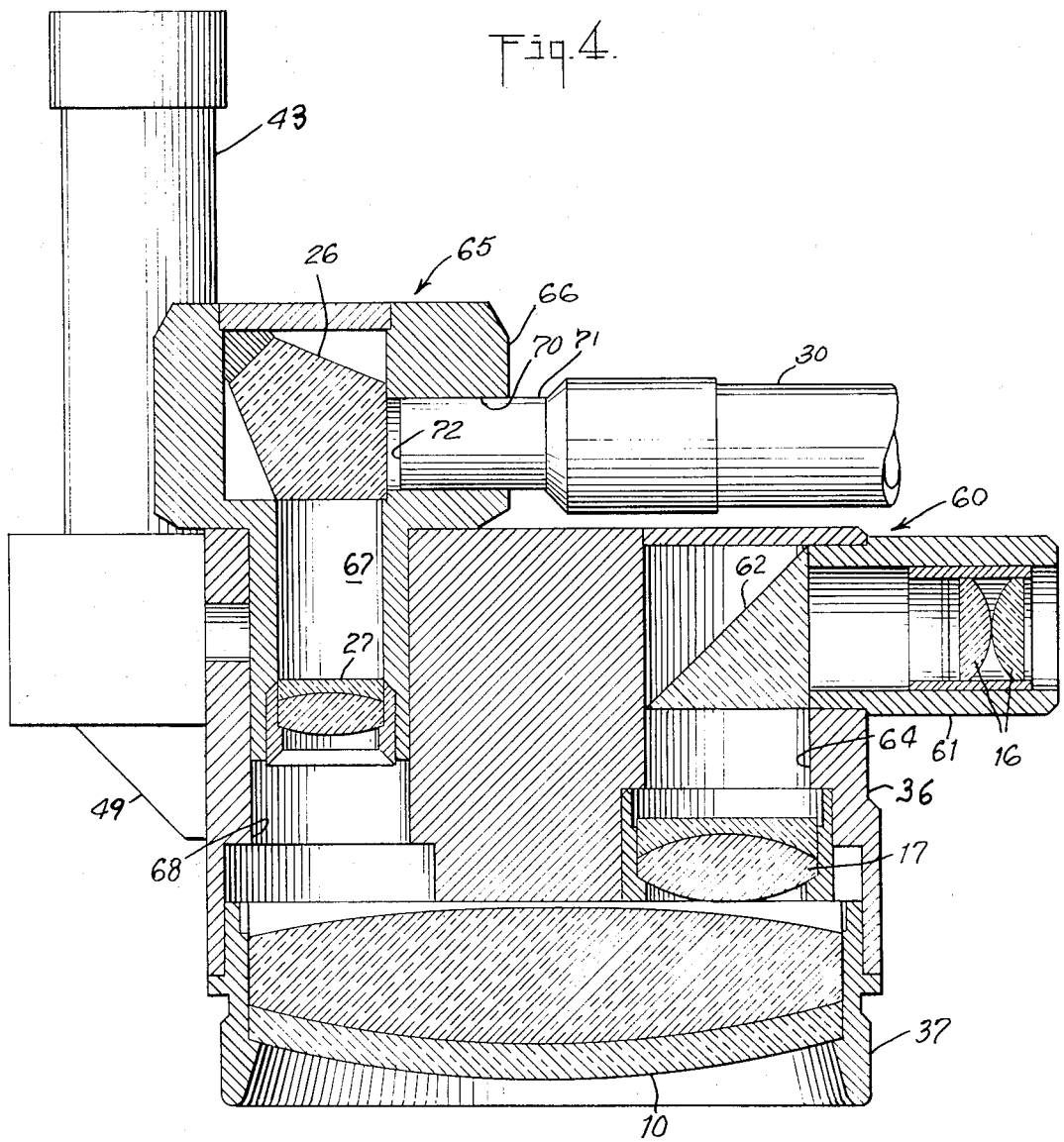
FIG. 4 is a section through 4—4 of FIG. 3.

FIG. 3 is a front elevation of microscope 35 to facilitate the description and give the correct orientation of the section in FIG. 4.

FIG. 4 taken through line 4—4 of FIG. 3 of the microscope only is a detailed cross-section showing the illuminating and remote-image optics. Eyepiece 43 and housing 49 of prism 12 are shown behind the plane of the section to facilitate orientation for better understanding of the Drawing. Body 36 is round and only slightly larger in diameter than objective lens 10 fitted into the lower portion thereof. It is to be recognized that the optical arrangement for direct viewing is similar to conventional prism binoculars. Most prism binoculars have the objective lenses outside of the eyepieces with the prisms enclosed in extensions of the objective lens housings. Some special compact binoculars have been made with the objective lenses inside the eyepieces as in the present microscope so that the prisms are left out in space and are enclosed as here with separate housings. Of course, in the present invention a single objective lens is used and such is not conventional in prism binoculars. This arrangement is not only very compact, but in the present invention has the important advantage of leaving space for direct access to the objective lens from the viewing side (top). Thus in FIG. 4 two additional optical systems are shown connected into body 36 facing lens 10. Illuminating optical system 60 is connected into body 36 in combination with rotary coupling 61 which also serves to mount microscope 35 to a supporting structure. Fiberoptics guide 18 (FIGS. 1 and 2) is brought in through the supporting structure coaxially with respect to coupling 61 so as to face collector lenses 16. Collector lenses 16 mounted within rotary coupling 61 face prism (or mirror) 62 mounted in passage 64 of body 36 so as to bend the optical path to be parallel with the optical axis of lens 10. Condensor lens 17, also mounted in passage 64 following prism 62, faces lens 10.

Image pickup assembly 65 is depicted as a plug-in adapter consisting of adapter body 66 carrying prism 26 and lens 27. Prism 26 is pentagonal in cross-section in order to reflect the optical path through a right angle while preserving the image orientation. Two properly positioned mirrors could be utilized for the same function. Lens 27 is contained in tubular extension 67 of body 66 extending into passage 68 of body 36 so that lens 27 faces lens 10. The optical path through lens 27 is aligned parallel to the optical axis of lens 10. Body 66 also has socket 70 aligned parallel with the axis of coupling 61. Connector 71 of coherent fiber-optics cable 30 is fitted into socket 70. Fiber-optics cable 30 has an optical face 72 facing prism 26. Lens 10, in the usual manner of microscope objectives, focuses the viewed object to infinity. Lens 27 intercepts image light from lens 10 and refocuses it to form an image at face 72. Connector 71 is adjustable incrementally in socket 70 (by means not illustrated) for focusing. Coherent fiber-optics cable 30, while depicted as connected to a TV camera, is also for use with suitable adapters for connection to a photographic camera, for individual viewing or for other utilization.

It is to be noted that both fiber-optics light guide 18 and cable 30 are virtually unnoticeable in the use of microscope 35 for direct viewing. Light guide 18 is connected coaxially through the mounting and cable 30 runs closely on top of body 36 to the mounting means adjacent to coupling 61. It is contemplated that the illuminating and remote image system can be interchanged so that the coherent fiberoptics cable would connect coaxial with coupling 61.

While the invention has been described in particular relation to long-viewing-distance stereo microscopes, it is applicable to other optical apparatus where direct access to the objective lens is available without interference with other utilization. Thus it is intended to cover the invention broadly within the spirit and scope of the appended claims.

We claim:

1. A long-working-distance microscope comprising:
   a. A direct viewing stereo microscope system having a housing carrying two oculars, two prism systems and two objective systems facing a single common objective lens in spaced parallel relationship, said oculars being adjacent to one side of said housing;
   b. an illuminating optical system comprising a light source, an illuminating lens assembly facing said common objective lens and a fiberoptics light guide connecting said light source and said lens assembly;
   c. a fiberoptics imaging system including a coherent fiberoptics cable having a primary objective lens physically facing said common objective lens to provide a remote output image, the optical axes of said primary objective lens and said common objective lens being parallel, said fiberoptics imaging system including a plug-in assembly having double reflecting means for intercepting image carrying light from said common objective lens and reflecting it at a right angle, and a socket for receiving a connector end of said coherent fiberoptics cable at right angles to the optical axis of said common objective lens; and
   d. support means for supporting said microscope system in a viewing position including a single coupling connected to said microscope housing on the side opposite said one side through which the fiber-optics of one of said illuminating optical system and said imaging optical system passes coaxially, the other passing parallel with the one and on top of said coupling.

2. A long-working-distance microscope according to claim 1 wherein said fiberoptics imaging system is connected to a remote television camera.

3. A long-working-distance microscope according to claim 1 wherein said double reflecting means is a prism of pentagonal cross-section.

* * * * *